US012735546B2

(12) United States Patent
Cernohous et al.

(10) Patent No.: US 12,735,546 B2
(45) Date of Patent: Sep. 15, 2026

(54) WATER SOLUBLE POLYMER BLEND COMPOSITIONS

(71) Applicant: Infinite Consultants LLC, Prescott, WI (US)

(72) Inventors: Jeffrey J. Cernohous, Hudson, WI (US); Brandon Cernohous, Hudson, WI (US); Nathan W. Ockwig, Eagan, MN (US); Gavriel DePrenger-Gottfried, Woodbury, MN (US); Robert A. Follensbee, Oakdale, MN (US); Jonathan Farren, Lakeville, MN (US)

(73) Assignee: Interfacial Consultants LLC, Prescott, WI (US)

( * ) Notice: Subject to any disclaimer, the term of this patent is extended or adjusted under 35 U.S.C. 154(b) by 667 days.

(21) Appl. No.: 17/921,002

(22) PCT Filed: Apr. 22, 2021

(86) PCT No.: PCT/US2021/028648
§ 371 (c)(1),
(2) Date: Oct. 24, 2022

(87) PCT Pub. No.: WO2021/216877
PCT Pub. Date: Oct. 28, 2021

(65) Prior Publication Data

US 2023/0167262 A1 Jun. 1, 2023

Related U.S. Application Data

(60) Provisional application No. 63/014,750, filed on Apr. 24, 2020.

(51) Int. Cl.
*C08J 9/26* (2006.01)
*C08K 5/1545* (2006.01)

(52) U.S. Cl.
CPC ............... *C08J 9/26* (2013.01); *C08K 5/1545* (2013.01); *C08J 2201/0464* (2013.01);
(Continued)

(58) Field of Classification Search
CPC .. C08J 9/26; C08J 2201/0464; C08J 2323/12; C08J 2367/04; C08J 2375/06;
(Continued)

(56) References Cited

U.S. PATENT DOCUMENTS 5,290,827 A 3/1994 Shine
2003/0008930 A1 1/2003 Hekal
2003/0138612 A1 7/2003 Kody et al.
2010/0233458 A1* 9/2010 Sun .......................... D01F 8/14 428/401

(Continued)

FOREIGN PATENT DOCUMENTS

CN 1624025 6/2005
CN 101553607 10/2009

(Continued)

OTHER PUBLICATIONS

International Search Report and Written Opinion for PCT/US2021/028648 date mailed Aug. 9, 2021.

(Continued)

*Primary Examiner* — Doris L Lee
(74) *Attorney, Agent, or Firm* — Madison C. Szewczyk

(57) ABSTRACT

A water soluble polymer blend composition includes at least one water soluble polymer and at least one immiscible polymer. The water soluble polymer and the immiscible polymer can be melt processed at a temperature above their respective melt processing temperatures and quenched to form the water soluble polymer blend composition in a non-equilibrium state, such that it can exhibit a non-equilibrium morphology. Non-equilibrium morphologies can include, e.g., a microfiber morphology or a co-continuous morphology.

15 Claims, 7 Drawing Sheets

(52) U.S. Cl.
CPC ........ *C08J 2323/12* (2013.01); *C08J 2367/04* (2013.01); *C08J 2375/06* (2013.01); *C08J 2377/06* (2013.01)

(58) Field of Classification Search
CPC ......................... C08J 2377/06; C08J 2375/04; C08J 2377/00; C08K 5/1545; C08K 5/053; B29C 64/40; B29C 64/118; B33Y 10/00; B33Y 70/00; C08L 101/14; C08L 29/04; C08L 39/06
See application file for complete search history.

(56) References Cited

U.S. PATENT DOCUMENTS

| | | | | |
|---|---|---|---|---|
| 2014/0182613 | A1 | 7/2014 | Lemmouchi et al. | |
| 2016/0068678 | A1 | 3/2016 | Luo et al. | |
| 2017/0058142 | A1* | 3/2017 | Vicari | B65D 65/46 |
| 2018/0111337 | A1 | 4/2018 | Demuth et al. | |
| 2018/0340089 | A1* | 11/2018 | Brunner | B33Y 70/00 |

FOREIGN PATENT DOCUMENTS

| | | |
|---|---|---|
| CN | 106188971 | 12/2016 |
| CN | 110730800 | 1/2020 |
| JP | 2016-210958 | 12/2016 |
| JP | 2018-099788 | 6/2018 |
| JP | 2018-099789 | 6/2018 |
| JP | 2021-104649 | 7/2021 |
| WO | WO0160897 | 8/2001 |
| WO | WO2018218203 | 11/2018 |
| WO | WO2021200153 | 3/2021 |

OTHER PUBLICATIONS

KR Request for the Submission of an Opinion for KR Application No. 10-2022-70490876 dated Nov. 24, 2025.

CN First Office Action for CN Application No. 2021800304981 dated Jul. 5, 2024.

JP Notice of Reasons for Refusal for JP Application No. 2022-563217 dated Jun. 2, 2025.

JP Written Opinion for JP Application No. 2022-563217 dated Dec. 5, 2025.

JP Search Report for JP Application No. 2022-563217 date searched Apr. 1, 2025.

EP Search Report and Opinion for EP Application No. 21792067.7 dated Apr. 4, 2024.

* cited by examiner

WATER SOLUBLE POLYMER BLEND COMPOSITIONS

CROSS-REFERENCE TO RELATED APPLICATION

This application claims priority to U.S. Provisional Application No. 63/014,750 filed Apr. 24, 2020, which is hereby incorporated by reference.

TECHNICAL FIELD

This disclosure relates to compositions and methods for making and using a water soluble polymer blend composition.

BACKGROUND

Additive manufacturing processes, commonly referred to as three-dimensional (3D) printing, can be used to construct desired objects with possible applications in numerous industries (e.g., aerospace, automotive, medical, etc.). Exemplary processes include, but are not limited to, binder jet, electron beam melting (EBM), fused deposition modeling (FDM), fused filament fabrication (FFF), ink jetting, laminated object manufacturing (LOM), selective laser sintering (SLS), and stereolithography (SL). Using such processes, a desired object can be modeled in a computer-aided design (CAD) package and printed using a selected build material. For deposition-based methods, like FDM, the selected build material is typically extruded through a heated printer in a layered manner according to computer instruction. Printing in commercially available additive manufacturing devices, like, for example, the ARBURG™ Freeformer system, often occurs in a build chamber that can provide heating and temperature control.

Many additive manufacturing techniques use support layers or structures to build a desired object. The limited availability of suitable support methods, materials, and structures, however, has restricted 3D printing to certain design types. The most basic support method uses the same material for support as it does for the printed object. With this technique, a support is erected similarly to scaffolding on a building and "props up" any steeply angled overhangs or spans. Referred to as "breakable" or "raft" support, this type of support can be effective, but can also be messy, time-consuming, and difficult to remove by mechanical breakage or trimming. It is not unusual to spend hours cleaning or cutting away support material from a 3D-printed object using razor blades, scalpels, sandpaper, and even power tools. Methods using different support and printed materials can also be problematic. For example, certain hydrophobic polymers (e.g., polypropylene) are nearly impossible to print due to the incompatibility between the support materials and the 3D-printed base resin.

The inability to remove internal support materials can further restrict object design types. Some external geometries can make it difficult, if not impossible, to remove internal support material. For years, many have tried to solve this problem with support structures that are supposed to dissolve in very hot water, highly acidic or basic conditions, organic solvents, or various other chemicals. These products are often messy and even dangerous- and in general have been unsuccessful.

SUMMARY

Water soluble polymer blend compositions, including at least one water soluble polymer (e.g., polyvinyl alcohol copolymer (PVOH)) and at least one immiscible polymer (e.g., Nylon 12), can solve several additive manufacturing problems: such compositions can dissolve or disintegrate in room temperature water, at neutral pH, can be compatible with both hydrophilic and hydrophobic polymers, and can be used as a support material for build chamber temperatures of at least about 100° C., which may, for example, be desirable when 3D printing high temperature thermoplastics.

Additionally, water soluble polymer blend compositions can be unique in that such compositions reside in a non-equilibrium morphology that results in improved mechanical properties, temperature resistance, and functionality. Some embodiments have improved mechanical properties that make the water soluble polymer blend composition amenable for 3D printing using a filament type printer, including flexural modulus, storage modulus (at elevated temperatures), impact strength, tensile strength, and coefficient of linear thermal expansion (CLTE). For example, when a material having a low flexural modulus (e.g., less than 100,000 psi) is melt processed with a water soluble polymer, it can produce a water soluble polymer blend composition with increased flexural modulus, a desirable attribute in a filament based 3D printer. Non-limiting examples of articles produced from such compositions and morphologies include, but are not limited to, cushioning, textiles, medical supplies, automotive parts, filters, separators, armor, insulation, agricultural films, construction materials, soluble supports, microfibers, microporous filters, battery separators, and microfoams.

In some embodiments, a water soluble polymer blend composition includes at least one water soluble polymer and at least one immiscible polymer. The water soluble polymer and immiscible polymer can be processed above their respective melt processing temperatures and quenched to form the water soluble polymer blend composition, such that the water soluble polymer blend composition has a non-equilibrium morphology. Non-equilibrium morphologies can include microfiber or co-continuous morphologies. At least a portion of the water soluble polymer of the water soluble polymer blend composition can be removed by dissolution in water, such that a higher proportion of the immiscible polymer remains. The water soluble polymer blend composition can exhibit unique morphologies after dissolution of at least a portion of the water soluble polymer, including microfiber morphology or co-continuous porous morphology. Immiscible polymer microfibers are liberated by dissolving at least a portion of the water soluble polymer of a water soluble polymer blend composition having a microfiber morphology.

In some embodiments, a three-dimensional printed article includes a three-dimensional printed object generally disposed on a substantially horizontal build plate in a build chamber and one or more soluble supports, including a water soluble polymer blend composition, positioned about and supporting one or more portions of the three-dimensional printed object. The water soluble polymer blend composition can be formed by melt processing a water soluble polymer and an immiscible polymer. The water soluble polymer blend composition can, e.g., be substantially stable at build chamber temperatures of at least about 100° C. In other embodiments, the build material of the three-dimensional printed article includes a water soluble polymer blend composition.

In some embodiments, a water soluble support includes a water soluble polymer blend composition formed by melt processing a water soluble polymer and an immiscible polymer. The water soluble support is substantially dry and substantially stable at build chamber temperatures of at least about 100° C.

In some embodiments, a water soluble support can be formed by melt processing a water soluble polymer and an immiscible polymer at a temperature above their respective melt processing temperatures to form a water soluble polymer blend composition; quenching the water soluble polymer blend composition in a non-equilibrium state to provide a non-equilibrium morphology; forming a feedstock from the water soluble polymer blend composition; and 3D printing the water soluble polymer blend composition to form the water soluble support.

In some embodiments, various unique, non-equilibrium morphologies, including, e.g., microfiber morphology or co-continuous porous morphology, can be formed by melt processing a water soluble polymer and an immiscible polymer at a temperature at or above their melt processing temperatures to form a water soluble polymer blend composition; quenching the water soluble polymer blend composition in a non-equilibrium state to provide a non-equilibrium morphology; forming a feedstock from the water soluble polymer blend composition; 3D printing the water soluble polymer blend composition; and removing at least a portion of the water soluble polymer of the water soluble polymer blend composition by dissolution in water to form the unique morphology.

The above summary is not intended to describe each disclosed embodiment or every implementation. The detailed description that follows more particularly exemplifies illustrative embodiments.

DETAILED DESCRIPTION

Figure 1:
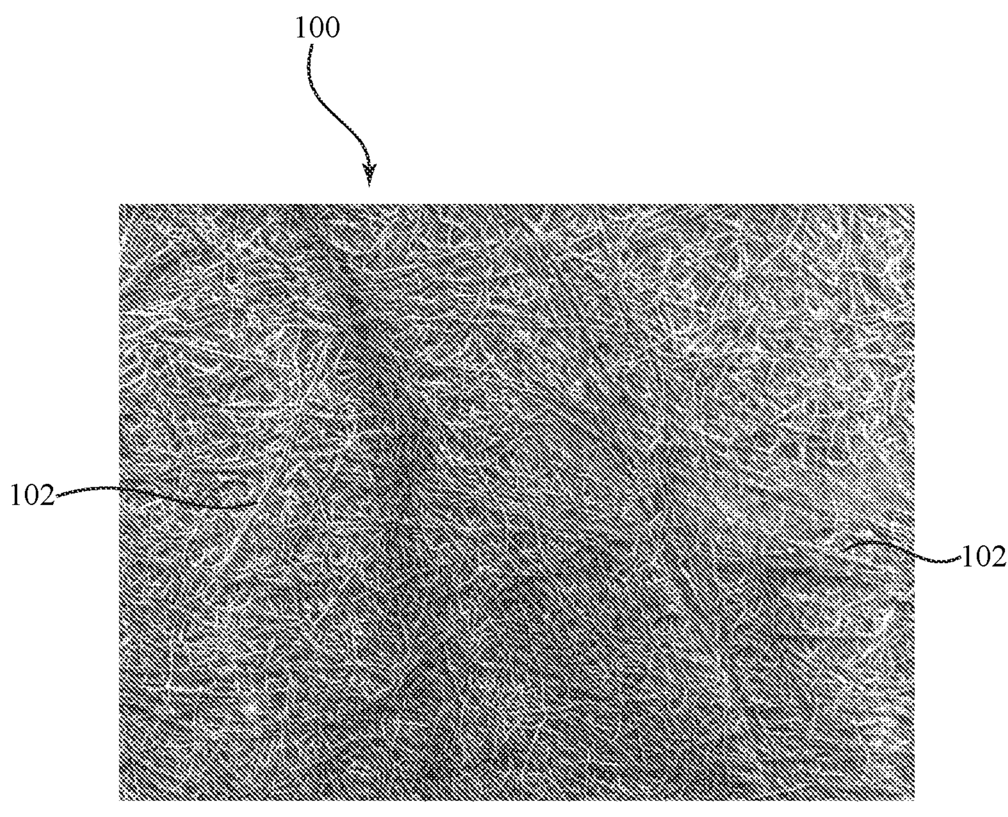
FIG. 1 is a scanning electron microscope image at 1000X depicting a microfiber morphology in a water soluble polymer blend composition after removal of the water soluble polymer.

Unless the context indicates otherwise the following terms shall have the following meaning and shall be applicable to the singular and plural:

The terms "a," "an," "the," "at least one," and "one or more" are used interchangeably. Thus, for example, a water soluble polymer blend composition including "a" water soluble polymer means that the water soluble polymer blend composition may include "one or more" water soluble polymers.

The terms "additive manufacturing", "three-dimensional printing", "3D printing," or "3D printed" refer to any process used to create a three-dimensional object in which successive layers of material are formed under computer control (e.g., electron beam melting (EBM), fused deposition modeling (FDM), ink jetting, laminated object manufacturing (LOM), selective laser sintering (SLS), and stereolithography (SL)).

The term "build chamber" refers to a volume, often enclosed, in or utilized by an additive manufacturing device within which a desired object can be printed. A non-limiting example of build chamber can be found in an ARBURG™ Freeformer (commercially available from Arburg GmbH, Lossburg, Germany).

The term "build chamber temperature" refers to the temperature provided in a build chamber during additive manufacturing.

The term "build material" refers to a material that is printed in three dimensions using an additive manufacturing process to produce a desired object, often remaining after removal of a soluble support.

The term "build plate" refers to a substrate, often a removable film or sheet, that a build material or soluble support can be printed on.

The term "co-continuous morphology" refers to a water soluble polymer blend composition produced by melt processing at least one water soluble polymer and at least one immiscible polymer; wherein both the water soluble polymer phase and the immiscible polymer phase have a non-equilibrium continuous structure throughout the water soluble polymer blend composition.

The term "co-continuous porous morphology" refers to water soluble polymer blend composition, with a co-continuous morphology, produced by melt processing at least one water soluble polymer and at least one immiscible polymer; wherein at least a portion of the water soluble polymer is subsequently removed from the composition.

The term "compatibilizer" refers to an additive that reduces the interfacial tension between the water soluble polymer and the immiscible polymer in a water soluble polymer blend composition.

The term "composition" refers to a multicomponent material.

The term "copolymer" refers to a polymer derived, actually (e.g., by copolymerization) or conceptually, from more than one species of monomer. A copolymer obtained from two monomer species is sometimes called a biopolymer; a copolymer obtained from three monomers is sometimes called a terpolymer; a copolymer obtained from four monomers is sometimes called a quaterpolymer; etc. A copolymer can be characterized based on the arrangement of branches in the structure, including, e.g., as a linear copolymer and a branch copolymer. A copolymer can also be characterized based on how the monomer units are arranged, including, e.g., as an alternating copolymer, a periodic copolymer, a statistical copolymer, a graft copolymer, and a block copolymer.

The term "crystalline" refers to a polymeric composition with crystallinity greater than 90% as measured by differential scanning calorimetry (DSC) in accordance with ASTM standard D3418-12-Standard Test Method for Transition Temperatures and Enthalpies of Fusion and Crystallization of Polymers by Differential Scanning calorimetry.

The terms “disaccharide,” “double sugar,” or “biose” refer to a sugar compound formed, whether actually or conceptually, by a glycosidic bond between two monosaccharides or monosaccharide residues.

The term “feedstock” refers to the form of a material that can be utilized in an additive manufacturing process (e.g., as a build material or soluble support). Non-limiting feedstock examples include pellets, powders, filaments, billets, liquids, sheets, shaped profiles, etc.

The term “high temperature thermoplastic” refers to a polymer or polymeric composition that is typically melt processed at or above about 220° C. Non-limiting examples of high temperature thermoplastics include, but are not limited to, polycarbonate (PC), polyamides (Nylon), polyesters (PET), polyether ether ketone (PEEK), and polyetherimide (PEI).

The terms “immiscible” or “immiscibility” refer to the compatibility of materials in a composition (e.g., a water soluble polymer blend composition), such that the composition exhibits behavior expected of a two or more phase system, often shown by the composition having more than one glass transition temperature and/or melting temperature (e.g., when tested using differential scanning calorimetry).

The term “immiscible polymer” refers to a polymer that is immiscible with respect to a water soluble polymer in a water soluble polymer blend composition.

The term “melt processing technique” refers to a technique for applying thermal and mechanical energy to reshape, blend, mix, or otherwise reform a polymer or composition, such as compounding, extrusion, injection molding, blow molding, rotomolding, or batch mixing. 3D printing processes that are useful in printing thermoplastic and elastomeric melt processable materials are examples of a melt processing technique.

The term “melt processing temperature” refers to the higher of the glass transition temperature or melting temperature for an amorphous, crystalline, or semi-crystalline polymer.

The term “microfiber morphology” refers to a water soluble polymer blend composition produced by melt processing at least one water soluble polymer and at least one immiscible polymer; wherein the immiscible polymer has non-equilibrium fibrous morphology with immiscible polymer microfibers having an average diameter of less than 50 microns and an aspect ratio of at least 5:1 (length:diameter).

The term “mixing” means to combine or put together to form one single substance, mass, phase, or more homogenous state. This may include, but is not limited to, all physical blending methods, extrusion techniques, or solution methods.

The term “monomer” refers to a molecule that can undergo polymerization to contribute structural units to the essential structure of a polymer.

The term “monosaccharide” refers to a molecule that is a simple sugar and cannot be hydrolyzed to form a simpler sugar. The term includes aldoses, ketoses, and various derivatives, such as sugar alcohols. Such derivatives can, e.g., be formed, whether actually or conceptually, by oxidation, deoxygenation, introduction of other substituents, alkylation and acylation of hydroxy groups, and chain branching. Non-limiting examples of a monosaccharide include triose, tetrose, glyceraldehyde, and dihydroxyacetone.

The term “non-equilibrium morphology” refers to the morphology of a water soluble polymer blend composition that has been kinetically trapped (i.e., quenched) in a non-equilibrium state, that when heated above the melt processing temperature of the water soluble polymer blend composition results in a visual morphological change (e.g., blend coalescence, aspect ratio change, etc.).

The term “oligosaccharide” means a small number (e.g., 2 to 6, or 2 to 4) of monosaccharide residues covalently linked.

The terms “polymer” and “polymeric” refer to a molecule of high relative molecular mass, the structure of which essentially contains multiple repetitions of units derived, actually or conceptually, from molecules of low relative molecular mass. The term “polymer” can refer to a “copolymer.”

The term “polysaccharide” refers to compounds consisting of many monosaccharide units, disaccharide units, oligosaccharide units, or residues thereof linked glycosidically (e.g., starch).

The terms “preferred” and “preferably” refer to embodiments that may afford certain benefits, under certain circumstances. Other embodiments, however, may also be preferred, under the same or other circumstances. Furthermore, the recitation of one or more preferred embodiments does not imply that other embodiments are not useful and is not intended to exclude other embodiments from the claimed scope.

The terms “quenched” and “quenching” refer to rapidly cooling a water soluble polymer blend composition below the glass transition temperature and/or melting temperature of either the water soluble polymer or the immiscible polymer to kinetically trap the water soluble polymer blend composition in a non-equilibrium state to provide a non-equilibrium morphology.

The term “semi-crystalline” refers to a polymeric composition with crystallinity greater than 5% but less than 90% as measured by differential scanning calorimetry (DSC) in accordance with ASTM standard D3418-12-Standard Test Method for Transition Temperatures and Enthalpies of Fusion and Crystallization of Polymers by Differential Scanning calorimetry.

The terms “soluble support”, “soluble support material”, or “water soluble support” refer to a material that is printed in three dimensions using an additive manufacturing process to physically support or brace the build material during 3D printing and that can be removed by chemical solvation or dissolution as desired during or after the additive manufacturing process.

The term “substantially dry” means that the substance contains by weight about 15% or less volatiles, and preferably about 10% or less volatiles, at standard conditions based on the weight of the water soluble polymer blend composition.

The terms “substantially stable” or “substantial stability” refer to a material that largely exhibits dimensional stability (e.g., with minimal flow, melting, or deformation) at print processing temperatures (e.g., a build chamber temperature).

The term “sugar” refers to a compound including carbon, hydrogen, and oxygen, such as an aldose or a ketose, that can have, but is not limited to, a stoichiometric formula of $C_n(H2O)_n$. The term can refer to any monosaccharide, disaccharide, oligosaccharide, or polysaccharide as well as a compound derived, whether actually or conceptually, from them by reduction of the carbonyl group (alditols), by oxidation of one or more terminal groups to a carboxylic acid, or by replacement of one or more hydroxy group(s) by a hydrogen atom, an amino group, thiol group, or similar groups. The term can also refer to a derivative, whether actual or conceptual, from such a compound.

The term "water soluble" refers to a material that absorbs, swells, dissolves, disintegrates, or deteriorates in the presence of water.

The term "water soluble polymer blend composition" refers to a composition that includes at least one water soluble polymer and at least one immiscible polymer, and can optionally include a sugar and/or additives.

The recitation of numerical ranges using endpoints includes all numbers subsumed within that range (e.g., 1 to 5 includes 1, 1.5, 3, 3.95, 4.2, 5, etc.).

The water soluble polymer blend compositions of the present disclosure comprise at least one water soluble polymer and at least one immiscible polymer. In another embodiment, a water soluble polymer blend composition employs a variety of sugars, which can enhance solubility and adhesion to hydrophobic polymers. In yet another embodiment, a water soluble polymer blend composition employs a variety of additives that can impart certain attributes and functionality to the resulting water soluble polymer blend composition. In another embodiment, a compatibilizer is added to the water soluble polymer blend composition to help improve the mixing, compatibility, and mechanical properties of the water soluble polymer blend composition.

A variety of water soluble polymers may be employed in a water soluble polymer blend composition. Non-limiting examples of water soluble polymers include coagulants, such as quaternary polyamines, polydiallyl ammonium chloride (polyDADMAC), and dicyandiamide resins; flocculants, such as nonionic, anionic, and cationic materials; amphoteric polymers; polyethyleneimines; polyamide-amines; polyamine-based polymers; polyethylene oxides; sulphonated compounds; polyvinylpyrrolidone; polylactic acid; polylactones; polyacrylate-type dispersants; poly vinyl alcohols; cellulose derivatives; and copolymers or combinations thereof. Non-limiting examples of water soluble copolymers include copolymers of polyvinyl alcohols (PVOH), including polyvinyl alcohol-co-vinylpyrrolidinone (PVOH-co-PVP), polyvinyl alcohol-co-vinylamine, polyvinyl alcohol-co-vinyl acetate, polyvinyl alcohol-co-butenediol vinyl alcohol, polyvinyl alcohol-co-vinyl acetate, polyvinyl alcohol-co-polyacrylate, and polyvinyl alcohol-co-polymethacrylate. Non-liming examples of commercially available water soluble copolymers include PVOH-co-PVP, sold as ULTILOC 4005™ by Seikisui Corporation; BVOH, sold as NICHIGO GPOLYMER™ by Nippon Goshei; poly-2-ethyloxazoline, sold as AQUAZOL™ by Polymer Chemistry Innovations, Inc.; and hydroxypropyl methylcellulose, sold as AFFINISOL™ by Dow Chemical Co.

A variety of immiscible polymers may be employed in a water soluble polymer blend composition. An immiscible polymer may impart certain physical properties including, but not limited to, increasing the viscosity or modulus of the material at elevated temperatures. Non-limiting examples of immiscible polymers include high density polyethylene (HDPE), low density polyethylene (LDPE), linear low density polyethylene (LLDPE), crosslinked polyethylene (PEX), vulcanized rubber, functional polyolefin copolymers including polyolefin based ionomers, polypropylene (PP), polyolefin copolymers (e.g., ethylene-butene, ethylene-octene, ethylene vinyl alcohol), polystyrene, polystyrene copolymers (e.g., high impact polystyrene, acrylonitrile butadiene styrene copolymer), polyacrylates, polymethacrylates, polyesters, polyvinylchloride (PVC), fluoropolymers, polyamides, polyether imides, polyphenylene sulfides, polysulfones, polyacetals, polycarbonates, polyphenylene oxides, polyurethanes, thermoplastic elastomers (e.g., SIS, SEBS, SBS), epoxies, alkyds, melamines, phenolics, ureas, vinyl esters, cyanate esters, silicones, or combinations thereof. In preferred embodiments, an immiscible polymer includes a polyamide, such as Nylon 6, Nylon 6.6, Nylon 11, Nylon 12, a liquid crystalline polymer, including Vectra V400P (commercially available from Celanese, Inc, Florence, KY), or a combination thereof.

A variety of different loading levels of water soluble polymer and immiscible polymer can be employed in a water soluble polymer blend composition. In some embodiments, a water soluble polymer blend composition may, for example, include at least about 1 wt % water soluble polymer, or at least about 10 wt % water soluble polymer, or at least about 20 wt % water soluble polymer, or at least about 40 wt % water soluble polymer, and up to about 50 wt % water soluble polymer, or up to about 85 wt % water soluble polymer, or up to about 90 wt % water soluble polymer. In some embodiments, a water soluble polymer blend composition may, e.g., include between 1 to 99 wt % of an immiscible polymer. In some embodiments, a water soluble polymer blend composition may include at least about 0.1 wt % immiscible polymer, or at least about 1 wt % immiscible polymer, or at least about 2 wt % immiscible polymer, or at least about 5 wt % immiscible polymer, or at least about 20 wt % immiscible polymer, and up to about 50 wt % immiscible polymer, or up to about 75 wt % immiscible polymer, or up to about 90 wt % immiscible polymer, or up to about 95 wt % immiscible polymer, or up to about 99.9 wt % immiscible polymer. In a preferred embodiment, the water soluble polymer blend composition contains between 5 to 90 wt % of an immiscible polymer. In a most preferred embodiment, the water soluble polymer blend composition contains between 10 to 80 wt % of an immiscible polymer.

A variety of sugars may optionally be employed in a water soluble polymer blend composition. Such sugars can enhance solubility and adhesion to hydrophobic polymers. Non-limiting examples of sugars include monosaccharides, disaccharides, oligosaccharides, polysaccharides, sugar alcohols, or derivatives thereof. A non-limiting commercially available example of a sugar is trehalose, sold as TREHA™ sugar by Nagase Corporation (Tokoyo, Japan). Other exemplary sugars include, but are not limited to, sucrose, lactulose, lactose, maltose, cellobiose, chitobiose octaacetate, kojibiose, nigerose octaacetate, isomaltose, isomaltulose, beta,beta-trehalose, alpha,beta-trehalose, sophorose, laminaribiose, gentiobiose, turanose, maltulose, palatinose, gentiobiulose, mannobiose, melibiose, melibiulose, ructinose, ructinulose, melezitose, xylobiose, xylitol, ribitol, mannitol, sorbitol, galactitol, fucitol, iditol, inositol, perseitol, volemitol, isomalt, maltitol, lactitol, maltotriitol, or maltotetraitol.

It may be desirable to employ a sugar in a water soluble polymer blend composition that has at least a certain melting point. For example, it may be desirable to employ a sugar having at melting point of at least 85° C., of at least 100° C., of at least 125° C., of at least 140° C., of at least 150° C., of at least 160° C., of at least 175° C., of at least 180° C., of at least 185° C., of at least 186° C., of at least 190° C., of at least 195° C., of at least 196° C., of at least 200° C., of at least 203° C., of at least 210° C., of at least 215° C., of at least 250° C., of at least 253° C., of at least 300° C., or of at least 304° C. Some exemplary sugars and their respective melting points are shown in Table 1.

TABLE 1

SUGAR MELTING POINTS

| Material | Melting Point (° C.) | Material | Melting Point (° C.) |
|---|---|---|---|
| chitobiose octaacetate | 304-405 | Kojibiose | 175 |
| Laminaribiose | 253 | Lactulose | 169 |
| Inositol | 226 | Maltose (anhydrous) | 160-165 |
| Cellobiose | 225 | Meletiose | 152 |
| Trehalose | 203 | Turanose | 142 |
| Lactose | 203 | Palatinose | 125-128 |
| Sophorose | 196-198 | Maltulose | 125 |
| Xylobiose | 195 | Isomaltulose | 123 |
| Gentiobiose | 190-195 | Xylitol | 92 |
| Sucrose | 186 | Melibose | 85 |

A variety of additives may optionally be employed in a water soluble polymer blend composition. Non-limiting examples of suitable additives include antioxidants, light stabilizers, fibers, blowing agents, foaming additives, anti-blocking agents, heat reflective materials, heat stabilizers, impact modifiers, biocides, antimicrobial additives, compatibilizers, plasticizers, tackifiers, processing aids, lubricants, coupling agents, thermal conductors, electrical conductors, catalysts, flame retardants, oxygen scavengers, fluorescent tags, fillers, minerals, and colorants. Additives may be incorporated into a water soluble polymer blend composition as a powder, liquid, pellet, granule, or in any other extrudable form. The amount and type of conventional additives in a water soluble polymer blend composition may vary depending upon the polymeric matrix and the desired properties of the finished composition. In view of this disclosure, a person having ordinary skill in the art will recognize that an additive and its amount can be selected in order to achieve desired properties in the finished material. Typical additive loading levels may be, for example, approximately 0.01 to 5 wt % of the composition formulation.

In one embodiment, a compatibilizer is added to a water soluble polymer blend composition to help improve the mixing, compatibility, and mechanical properties of the water soluble polymer blend composition. A compatibilizer typically is selected by one skilled in the art depending on the specific water soluble polymer blend composition. Non-limiting examples of compatibilizers include functionalized polymers, block copolymers, silanes, titanates, zirconates, amphiphilic polymers, and copolymers. For example, functionalized polyolefins (e.g., maleated polyethylene or maleated polypropylene) are useful compatibilizers for a water soluble polymer that is blended with a polyolefin. In a preferred embodiment, maleated polypropylene (e.g., Linxidan 4435) is a useful compatibilizer for a blend of a water soluble polymer and polypropylene. Typical compatibilizer loading levels may be, for example, approximately 0.01 to 5 wt % of the water soluble polymer blend composition formulation.

In another embodiment, a filler is added to a water soluble polymer blend composition. Fillers are useful in that they allow one skilled in the art to adjust mechanical properties of the end-use article made using a polymeric material. Fillers can function to improve mechanical and thermal properties of the polymeric material. Fillers can also be utilized to reduce the coefficient of thermal expansion (CTE) of the polymeric article. Non-limiting examples of fillers are mineral and organic fillers including carbonates, silicates, talc, mica, wollastonite, clay, silica, alumina, carbon fiber, carbon black, carbon nanotubes, graphite, graphene, volcanic ash, expanded volcanic ash, perlite, glass fiber, solid glass microspheres, hollow glass microspheres, cenospheres, ceramics, and conventional cellulosic materials including: wood flour, wood fibers, sawdust, wood shavings, newsprint, paper, flax, hemp, wheat straw, rice hulls, kenaf, jute, sisal, peanut shells, soy hulls, or any cellulose containing material. The amount of filler in a water soluble polymer blend composition after melt processing is typically between 1 to 60 wt %. In a preferred embodiment, the filler loading level is between 1 to 50 wt %. In a most preferred embodiment, the filler loading level is between 1 to 30 wt %.

A water soluble polymer blend composition can be prepared by mixing, processing, or a combination thereof. Depending on the selected polymeric matrix, this can be done using a variety of mixing processes known to those skilled in the art in view of this disclosure. The water soluble polymer, immiscible polymer, and any optional sugars and/or additives can be combined, e.g., by a compounding mill, a Banbury mixer, or a mixing extruder. In another embodiment, a vented twin screw extruder is utilized. The materials may be used in the form of, for example, a powder, a pellet, or a granular product. The mixing operation is most conveniently carried out at a temperature above the melt processing temperature of the water soluble polymer or the immiscible polymer, or above the melt processing temperatures of both the water soluble polymer and the immiscible polymer. The resulting melt processed water soluble polymer blend composition can be extruded directly into the form of the final product shape, or can be pelletized or fed from the melt processing equipment into a secondary operation to pelletize the composition (e.g., using a pellet mill or densifier) for later use. In another embodiment, the water soluble polymer blend composition and any sugars and/or additives can be 3D printed.

Figure 2:
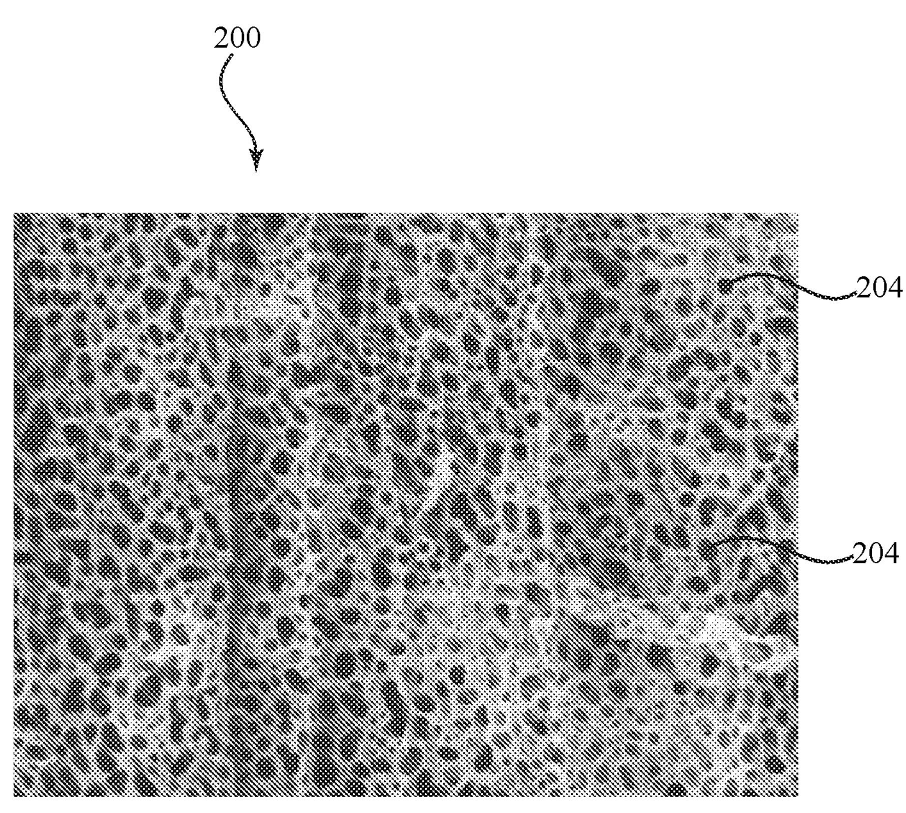
FIG. 2 is a scanning electron microscope image at 800X depicting a co-continuous porous morphology in a water soluble polymer blend composition after removal of the water soluble polymer.
Figure 3:
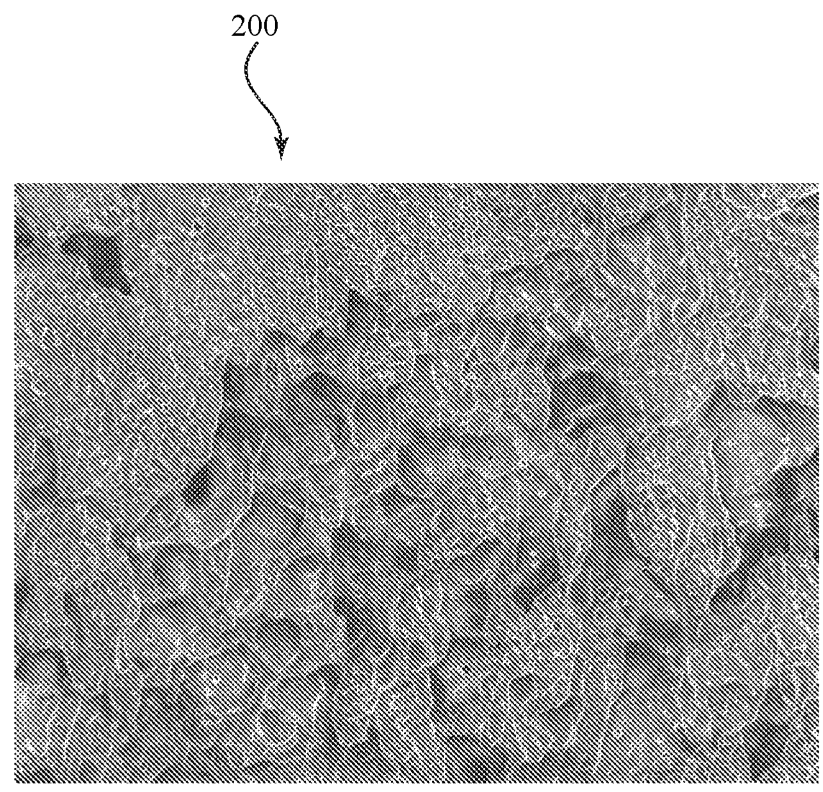
FIG. 3 is a scanning electron microscope image at 1000X depicting a co-continuous porous morphology in a water soluble polymer blend composition after annealing at 200° C. for 30 min, and subsequent removal of the water soluble polymer.

In some embodiments, the water soluble polymer and immiscible polymer are processed above their melt processing temperatures, and the resulting mixture is quenched during processing to form a water soluble polymer blend composition having a non-equilibrium morphology. Whether the morphology of a water soluble polymer blend composition is in a non-equilibrium state is determined by annealing the water soluble polymer blend composition at temperatures above the melt processing temperatures of both the water soluble polymer and the immiscible polymer. If the morphology changes upon annealing, the water soluble polymer blend composition is in non-equilibrium state. An example of this morphological change upon annealing is demonstrated by comparison of FIGS. 2 and 3. FIGS. 2 and 3 show cross-sections of water soluble polymer blend composition 200. FIG. 2 shows water soluble polymer blend composition 200 after removal of the water soluble polymer, while water soluble polymer blend composition 200 of FIG. 3 was annealed before removal of the water soluble polymer.

The morphological change of water soluble polymer blend composition 200 is exhibited by comparing non-annealed FIG. 2 with annealed FIG. 3.

Figure 6:
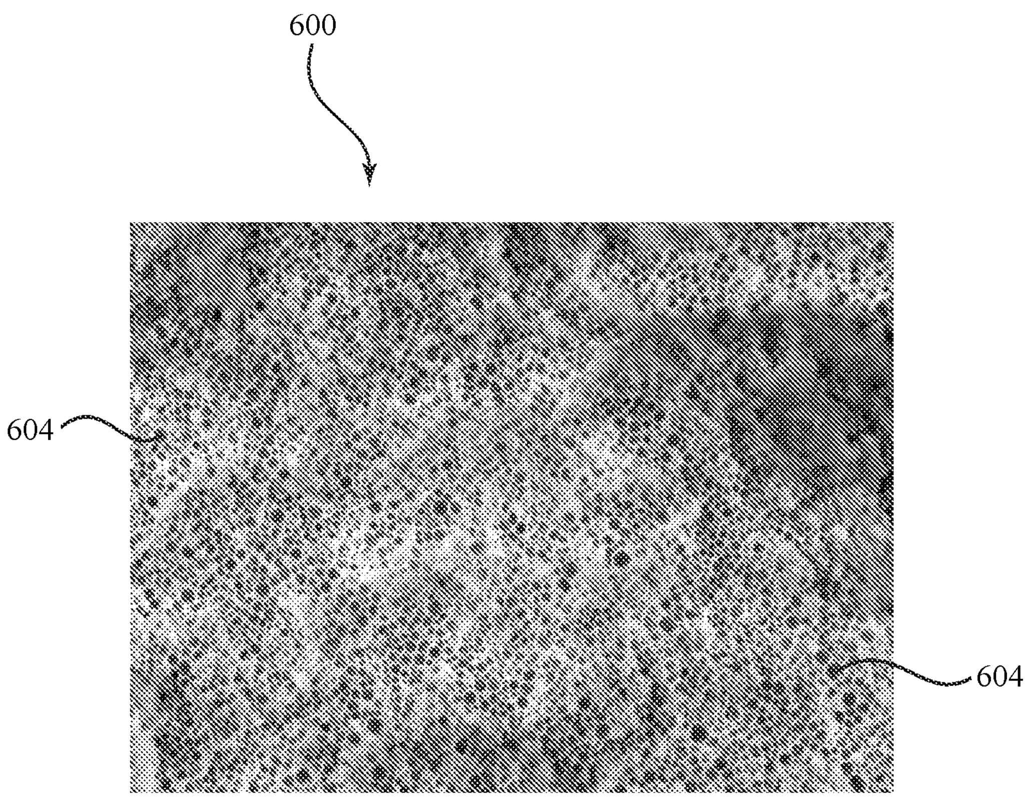
FIG. 6 is a scanning electron microscope image at 1000X depicting a co-continuous porous morphology in a water soluble polymer blend composition after removal of the water soluble polymer.
Figure 7:
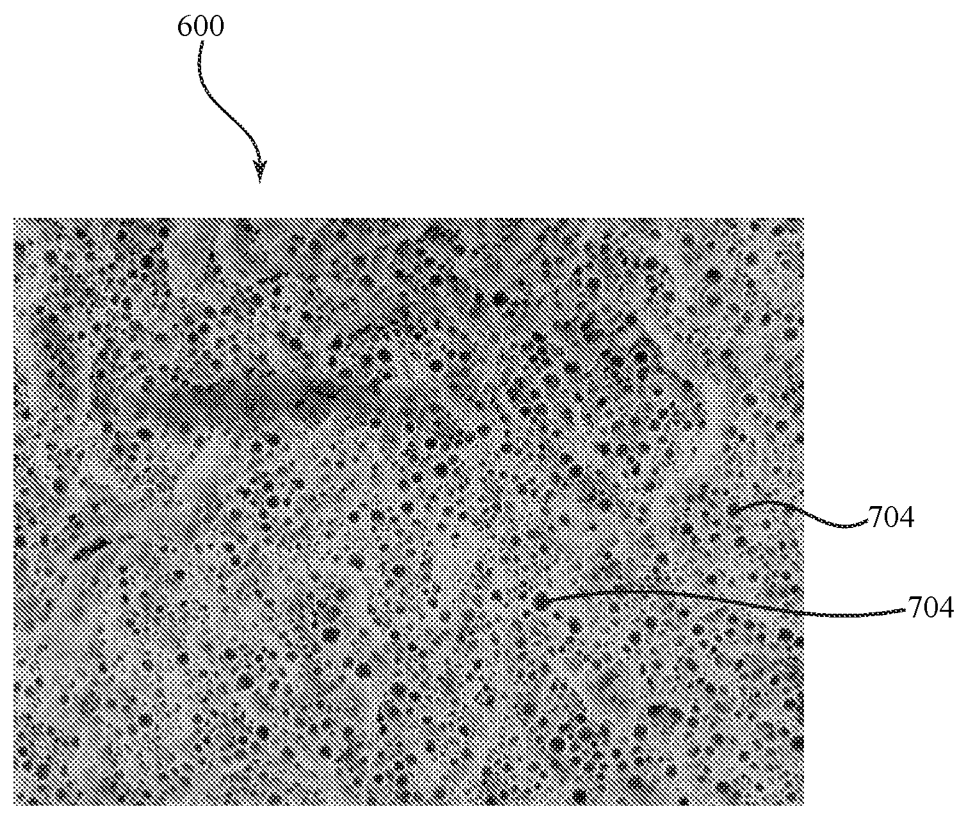
FIG. 7 is a scanning electron microscope image at 1000X depicting a co-continuous porous morphology in a water soluble polymer blend composition after annealing at 200° C. for 30 min, and subsequent removal of the water soluble polymer.

In another embodiment, the water soluble polymer blend composition morphology is thermally stable after annealing by adding a compatibilizer to the water soluble polymer blend composition. The compatibilizer prevents morphological change after annealing by reducing the interfacial tension between the water soluble polymer and the immiscible polymer of the water soluble polymer blend composition. An example of this is exhibited by comparison of FIGS. 6 and 7. FIGS. 6 and 7 show cross-sections of water soluble polymer blend composition 600, which contains maleated polypropylene as a compatibilizer. FIG. 6 shows water soluble polymer blend composition 600 after removal of the water soluble polymer, while water soluble polymer blend composition 600 of FIG. 7 was annealed before removal of the water soluble polymer. The lack of morphological change in water soluble polymer blend composition 600 is exhibited by comparing non-annealed FIG. 6 with annealed FIG. 7. The prevention of morphological change by a compatibilizer can be appreciated further by a comparison of water soluble polymer blend composition 600 in non-annealed FIG. 6 and annealed FIG. 7 with water soluble polymer blend composition 200 in non-annealed FIG. 2 and annealed FIG. 3.

The non-equilibrium morphology of the water soluble polymer blend composition can be either a microfiber morphology or a co-continuous morphology. In some embodiments, the non-equilibrium morphology of the water soluble polymer blend composition is a microfiber morphology that is created in situ during melt processing. In another embodiment, at least a portion of the water soluble polymer in the water soluble polymer blend composition is removed by dissolution in water to provide immiscible polymer microfibers, an example of which is shown in FIG. 1. FIG. 1 shows a cross-section of water soluble polymer blend composition 100. The water soluble polymer of water soluble polymer blend composition 100 was removed by dissolution in water to provide immiscible polymer microfibers 102. In one embodiment, the immiscible polymer microfibers have an average diameter between at least 0.1 micron and up to 50 microns. In a preferred embodiment, the immiscible polymer microfibers have an average diameter between 0.5 to 25 microns. In a most preferred embodiment, the immiscible polymer microfibers have an average diameter between 1 to 10 microns. In one embodiment, the average length to diameter ratio (L:D) of the immiscible polymer microfibers is at least 3:1. In a preferred embodiment, the average L:D of the immiscible polymer microfibers is at least 5:1. In a most preferred embodiment, the average L:D of the immiscible polymer microfibers is at least 10:1.

In other embodiments, the water soluble polymer and immiscible polymer are processed above their melt processing temperatures and the resulting mixture is quenched to form a water soluble polymer blend composition with a co-continuous morphology, such that the water soluble polymer phase and the immiscible polymer phase have continuous paths throughout the bulk material. In some embodiments, at least a portion of the water soluble polymer in the water soluble polymer blend composition is removed by dissolution in water to provide a co-continuous porous morphology. The co-continuous porous morphology of a water soluble polymer blend composition contains co-continuous channels, examples of which are shown in FIG. 2. FIG. 2 shows a cross-section of the co-continuous porous morphology of water soluble polymer blend composition 200 after removal of the water soluble polymer. The co-continuous porous morphology of water soluble polymer blend composition 200 contains co-continuous channels 204. In one embodiment, the average diameter of the co-continuous channels in a water soluble polymer blend composition ranges from at least 0.1 micron and up to 50 microns. In a preferred embodiment, the average diameter of the co-continuous channels ranges from at least 0.5 micron and up to 25 microns. In a most preferred embodiment, the average diameter of the co-continuous channels ranges from at least 1 micron and up to 10 microns.

In another embodiment, the resulting microfiber morphology or co-continuous porous morphology is created after 3D printing an article using the water soluble polymer blend composition precursors. After printing, the water soluble polymer is removed with water. In another embodiment, the water is at an elevated temperature, up to the boiling point of water, to enhance the dissolution rate of the water soluble polymer.

A water soluble polymer blend composition can undergo additional processing for desired end-use applications. A water soluble polymer blend composition can be used as a feedstock in fused deposition modeling (FDM). In some preferred embodiments, the feedstock may be a filament but other feedstocks (e.g., film, sheet, shaped profile, powder, pellet, etc.) can also be used. For an FDM feedstock, it is desirable to have a proper balance of stiffness and toughness. This is because the material must function properly when processed using an FDM based 3D printer. If the material is too soft, it has a tendency to flex when the drive system tries to push or pull the filament into or out of the filament extruder head. If the filament is not tough enough, it has a tendency to break when traveling through the path to the filament extruder head. Those skilled in the art will recognize that an FDM filament composition should be designed to have the proper balance of stiffness and toughness in order to function with an FDM type printer.

It is well known in additive manufacturing that it can be challenging to print semi-crystalline and crystalline polymers because they have a tendency to shrink in the build chamber when allowed to relax. This can result in part warpage and curling. Surprisingly, water soluble polymer blend compositions, despite being semi-crystalline, provide printed parts with low warpage. This may be in part due to the excellent adhesion of the water soluble polymer blend composition to a variety of build materials and to the build plate. Water soluble polymer blend compositions can also show remarkable adhesion properties to a wide range of build plates and build materials including: polyethylene, polypropylene, ultra high molecular weight polyethylene (UMHWD), polytetrafluoroethylene, polyamide (e.g., Nylon 6, Nylon 6.6, Nylon 12), polyimide (e.g, Kapton), polyether-imide (PEI), polyetheretherketone (PEEK), polyacrylonitrile-butadiene-styrene (ABS), polylactic acid (PLA), polyacrylic (e.g., PMMA), polycarbonate (PC), and others.

A water soluble polymer blend composition can be used in additive manufacturing as a build material, or as a support material to create a water soluble support. A water soluble polymer blend composition can also be converted into an article using conventional melt processing techniques, such as compounding, extrusion, molding, and casting, or additive manufacturing processes. For use in additive manufacturing processes, a variety of additive manufacturing devices can employ water soluble polymer blend compositions as, for example, a water soluble support or build material. Non-limiting examples of such additive manufacturing devices include, but are not limited to, the Dremel DigiLab 3D45 3D Printer, LulzBot Mini 3D Printer, MakerBot Replicator+, XYZprinting da Vinci Mini, Ultimaker 3, Flashforge Finder 3D Printer, Robo 3D R1+Plus, Ultimaker 2+, Ultimaker 5s, and AON M2.

A water soluble polymer blend composition can be selectively removed as either a build or support material (e.g., by dissolution or mechanically) manually, automatically (e.g., computer controlled dissolution), or by some combination thereof. For example, a water soluble polymer blend composition can dissolve or disintegrate when exposed to water such that they are easy to remove from the three dimensional part produced using the water soluble polymer blend composition and the build material. A variety of sugars and/or additives, such as those already disclosed above, can be added to a water soluble polymer blend composition to form an article.

In one embodiment, a method of producing a water soluble support includes melt processing at least one water soluble polymer and at least one immiscible polymer at a temperature at or above the melt processing temperatures of the water soluble polymer and the immiscible polymer to form a water soluble polymer blend composition, quenching the water soluble polymer blend composition in a non-equilibrium state to provide a non-equilibrium morphology, forming a feedstock from the water soluble polymer blend composition, and 3D printing the water soluble polymer blend composition to form a water soluble support.

In another embodiment, various unique, non-equilibrium morphologies, including, e.g., microfiber morphology or co-continuous porous morphology, can be formed by melt processing at least one water soluble polymer and at least one immiscible polymer at a temperature at or above the melt processing temperatures of the water soluble polymer and the immiscible polymer to form a water soluble polymer blend composition, quenching the water soluble polymer blend composition in a non-equilibrium state to provide a non-equilibrium morphology, forming a feedstock from the water soluble polymer blend composition, 3D printing the water soluble polymer blend composition, and removing at least a portion of the water soluble polymer of the water soluble polymer blend composition by dissolution in water to form a microfiber morphology or a co-continuous porous morphology.

A water soluble polymer blend composition can provide a number of advantages. For example, a water soluble polymer blend composition can be substantially stable at build chamber temperatures of at least about 100° C., or at least about 140° C., or at least about 160° C., or at least about 180° C., or at least about 190° C., or at least about 200° C., or at least about 210° C. and up to about 300° C. When a water soluble polymer blend composition is used to form a water soluble support, the water soluble support is also substantially stable at build chamber temperatures of at least about 100° C., or at least about 140° C., or at least about 160° C., or at least about 180° C., or at least about 190° C., or at least about 200° C., or at least about 210° C. and up to about 300° C., as well as substantially dry at build chamber temperatures of at least about 100° C.

Water soluble polymer blend compositions and articles including such compositions have broad utility in a number of industries, including, but not limited to, additive manufacturing. These compositions and articles can provide significant value to plastics compounders and converters. The disclosed compositions and articles offer enhanced solubility and adhesion to hydrophobic polymers, tunable rheological properties, and increased stiffness at higher temperatures. Non-limiting examples of articles produced from such compositions include, but are not limited to, cushioning, textiles, medical supplies, automotive parts, filters, separators, armor, insulation, agricultural films, construction materials, soluble supports, microfibers, microporous filters, battery separators, and macrofoams.

In the following examples, all parts and percentages are by weight unless otherwise indicated.

EXAMPLES

TABLE 2

MATERIALS

| Material | Supplier |
|---|---|
| Water Soluble Polymer 1 (WSP 1) | "Aquasys 120", water soluble polymer, commercially available from Infinite Material Solutions, LLC (Prescott, WI) |
| Carbohydrate 1 (CH 1) | "Trehalose" sugar, commercially available from Nagase America, LLC (New York, NY) |
| Immiscible Polymer 1 (IP 1) | Nylon 10,12, commercially available from Ravago Manufacturing America's (Manchester, TN) |
| Immiscible Polymer 2 (IP 2) | "Radilon S.27" Nylon 6, commercially available from Radici Plastics (Italy) |
| Immiscible Polymer 3 (IP 3) | "Zytel 101NC010" Nylon 6,6 commercially available from DuPont (Wilmington, DE) |
| Immiscible Polymer 4 (IP 4) | "Grilamid L16" Nylon 12, commercially available from EMS-Grivory (Sumter, SC) |
| Immiscible Polymer 5 (IP 5) | "MXD6 S6007" meta-xylene diamine, commercially available from Mitsubishi Gas Chemical America, Inc. (New York, NY) |
| Immiscible Polymer 6 (IP 6) | "Elastollan Soft 45a 12P" Thermoplastic polyurethane commercially available from BASF Polyurethanes GmbH (Germany) |
| Immiscible Polymer 7 (IP 7) | "N20G Impact Copolymer" Polypropylene, commercially available from INEOS Olefins & Polymers USA (League City, TX) |
| Immiscible Polymer 8 (IP 8) | "Ingeo 2003D" Polylactide, commercially available from NatureWorks, LLC (Minnetonka, MN) |
| Immiscible Polymer 9 (IP 9) | "Linxidan 4435" Maleated Polypropylene, commercially available from SACO AEI Polymers, Inc (Sheboygan, WI) |
| Immiscible Polymer 10 (IP 10) | "Elastollan 1185A NAT" Thermoplastic Polyurethane, commercially available from BASF Polyurethanes U.K. Ltd (United Kingdom) |

TABLE 3

EXPERIMENTAL FORMULATIONS

| Formulation | WSP 1 | CH 1 | IP 1 | IP 2 | IP 3 | IP 4 | IP 5 | IP 6 | IP 7 | IP 8 | IP 9 | IP 10 |
|---|---|---|---|---|---|---|---|---|---|---|---|---|
| 1 | 80 | | 20 | | | | | | | | | |
| 2 | 60 | | 40 | | | | | | | | | |
| 3 | 80 | | | 20 | | | | | | | | |
| 4 | 60 | | | 40 | | | | | | | | |
| 5 | 80 | | | | 20 | | | | | | | |
| 6 | 60 | | | | 40 | | | | | | | |
| 7 | 80 | | | | | 20 | | | | | | |
| 8 | 60 | | | | | 40 | | | | | | |
| 9 | 80 | | | | | | 20 | | | | | |
| 10 | 60 | | | | | | 40 | | | | | |

TABLE 3-continued

| EXPERIMENTAL FORMULATIONS | | | | | | | | | | | | |
|---|---|---|---|---|---|---|---|---|---|---|---|---|
| Formulation | WSP 1 | CH 1 | IP 1 | IP 2 | IP 3 | IP 4 | IP 5 | IP 6 | IP 7 | IP 8 | IP 9 | IP 10 |
| 11 | | 80 | | | | | | 20 | | | | |
| 12 | | 60 | | | | | | 40 | | | | |
| 13 | 60 | | | | | | | | 38 | | 2 | |
| 14 | 60 | | | | | | | | 36 | | 4 | |
| 15 | 60 | | | | | | | | | 40 | | |
| 16 | 60 | | | | | | | | | 28 | | 12 |

Sample Preparation: Formulations 1-16

Each of Formulations 1-16 was prepared according to the weight ratios in Table 3. Formulations 1-16 were first blended in a plastic bag and gravimetrically fed into a 27 mm twin screw extruder (40:1 L:D, commercially available from Leistritz Extrusiontechnik GmbH, Germany). Compounding for Formulations 1-4, 7, and 8 was performed using the following temperature profile in zones 1-10:40, 250, 250, 250, 250, 250, 240, 230, 220, 220° C., respectively and a die temperature of 220° C. Compounding for Formulations 5 and 6 was performed using the following temperature profile in zones 1-10:40, 300, 300, 300, 300, 250, 240, 230, 220, 220° C., respectively and a die temperature of 220° C. Compounding for Formulations 9 and 10 was performed using the following temperature profile in zones 1-10:40, 200, 260, 260, 260, 250, 250, 240, 230, 230° C., respectively and a die temperature of 230° C. Compounding for Formulations 11 and 12 was performed using the following temperature profile in zones 1-10:40, 180, 180, 180, 180, 180, 180, 180, 180° C., respectively and a die temperature of 180° C. Compounding for Formulations 13 and 14 was performed using the following temperature profile in zones 1-10:40, 170, 200, 200, 190, 190, 190, 190, 190, 190° C., respectively and a die temperature of 190° C. Compounding for Formulations 15 and 16 was performed using the following temperature profile in zones 1-10:40, 200, 200, 200, 200, 200, 190, 190, 190, 190° C., respectively and a die temperature of 190° C. The extruder's screw speed was about 300 rpm, and the output rate was about 10 kg/hr. The mixture was then extruded onto an air cooled belt conveyor, pelletized into approximately 2.5 mm×2.5 mm cylindrical pellets, and collected in a plastic bag.

Water Soluble Polymer Removal: Formulations 7 and 13

Figure 4:
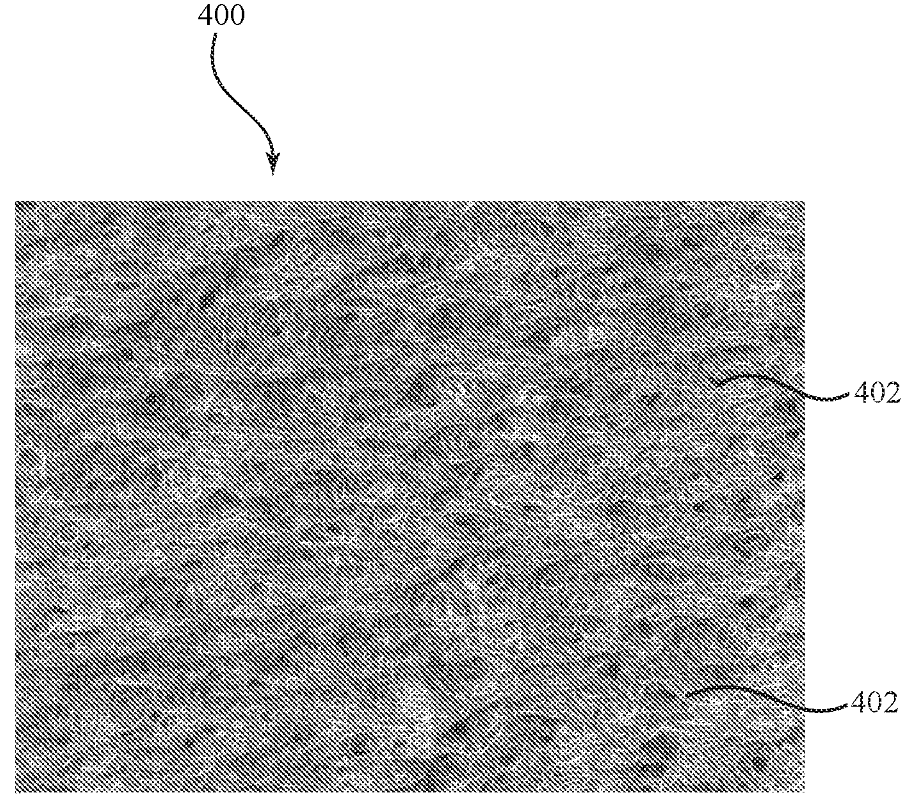
FIG. 4 is a scanning electron microscope image at 1000X depicting a microfiber morphology in a water soluble polymer blend composition after removal of the water soluble polymer.

The water soluble polymer of the water soluble polymer blend compositions of Formulations 7 and 13 were removed according to the following procedure. The pellets of Formulations 7 and 13 were placed in 200 mL of deionized water at 80° C. for 16 hours and then dried under vacuum at 80° C. Pellets were then submerged in liquid nitrogen and freeze-fractured to obtain pellet cross-section SEM images. In FIG. 4, water soluble polymer blend composition 400 of Formulation 7, which has a microfiber morphology, contains immiscible polymer microfibers 402 due to the removal of the water soluble polymer. In FIG. 6, water soluble polymer blend composition 600 of Formulation 13 shows a co-continuous porous morphology after removal of the water soluble polymer. The co-continuous porous morphology of water soluble polymer blend composition 600 of FIG. 6 contains co-continuous channels 604.

Annealing and Water Soluble Polymer Removal: Formulations 7 and 13

Figure 5:
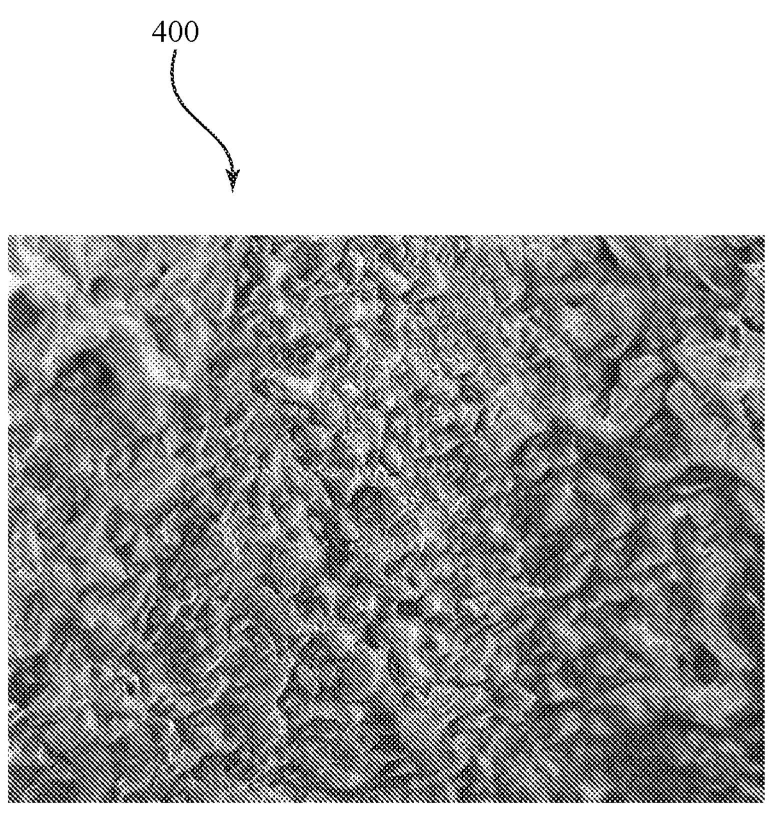
FIG. 5 is a scanning electron microscope image at 500X depicting a microfiber morphology in a water soluble polymer blend composition after annealing at 200° C. for 30 min, and subsequent removal of the water soluble polymer.

The water soluble polymer blend compositions of Formulations 7 and 13 were annealed then the water soluble polymers were removed according to the following procedure. The pellets of Formulations 7 and 13 were annealed at 200° C. for 30 minutes. The resulting annealed pellets of Formulations 7 and 13 were placed in 200 mL of deionized water at 80° C. for 16 hours and then dried under vacuum at 80° C. Pellets were then submerged in liquid nitrogen and freeze-fractured to obtain pellet cross-section SEM images. FIG. 5 shows the microfiber morphology of water soluble polymer blend composition 400 of Formulation 7 after annealing and subsequent removal of the water soluble polymer. FIG. 7 shows the co-continuous porous morphology of water soluble polymer blend composition 600 of Formulation 13 after annealing and subsequent removal of the water soluble polymer. The co-continuous porous morphology of water soluble polymer blend composition 600 of FIG. 7 contains co-continuous channels 704.

Example 1: Filament Preparation of Formulation 7

Filament preparation for Formulation 7 was conducted according to the following procedure. The pellets of Formulations 7 were dried for four hours at 90° C. and then extruded using a 1.75" single screw extruder with barrier screw, 24:1 L:D at a screw speed of 20 rpm, a temperature profile of 240° C. for all extruder zones, and an output rate of 10 kg/hr. Filament was extruded through a round die, air cooled, and wound onto a spool with a 3" core.

Example 2: Ultimaker Filament Formulation 7

A 2.85 mm thick filament of Formulation 7, produced according to Example 1, was printed on a ULTIMAKER 5S™ printer (commercially available from Ultimaker Inc.) using the following conditions. The extruder temperature was 240° C. The build plate temperature is 115° C. The print speed is 15 mm/s.

Example 3: Filament Preparation of Formulation 13

Filament preparation for Formulation 13 was conducted according to the following procedure. The pellets of Formulations 13 were dried for four hours at 80° C. and then extruded using a 1.75" single screw extruder with barrier screw, 24:1 L:D at a screw speed of 15 rpm, a temperature profile of 180° C. for all extruder zones, and an output rate of 7 kg/hr. Filament was extruded through a round die, air cooled, and wound onto a spool with a 3" core.

Example 4: Ultimaker Filament Formulation 13

A 2.85 mm thick filament of Formulation 13, produced according to Example 3, was printed on a ULTIMAKER 5S™ printer (commercially available from Ultimaker Inc.) using the following conditions. The extruder temperature was 230° C. The build plate temperature is 120° C. The print speed is 25 mm/s.

Disintegration Method Test 1: Formulations 1-10

For each of Formulations 1-10, a 5 gram pellet sample was placed in about 200 mL of deionized water at about 80° C. The disintegration time was reported at the time when the sample was completely disintegrated, such that there were no observable pellets. The results are provided in Table 4.

TABLE 4

DISINTEGRATION METHOD TEST RESULTS

| Formulation | Disintegration Time (min) | Observations |
|---|---|---|
| 1 | 60 | Milky water, pellets intact |
| 2 | >60 | Milky water, pellets intact |
| 3 | 60 | Pellets turned into sludge |
| 4 | >60 | Milky water, pellets intact |
| 5 | 60 | Pellets turned into sludge |
| 6 | >60 | Milky water, pellets intact |
| 7 | 60 | Pellets turned into sludge |
| 8 | >60 | Milky water, pellets intact |
| 9 | 60 | Pellets turned into sludge |
| 10 | >60 | Milky water, pellets intact |

Dissolution Method Test 1: Formulations 8, 10-16

For each of Formulations 8 and 10-16, a 5 gram pellet sample was placed in about 200 mL of deionized water at about 80° C. for 16 hours and then dried under vacuum at 80° C. The observed mass loss is reported as the percent mass loss between the pre-dissolution mass and the post-dissolution mass. The results are provided in Table 5.

TABLE 5

DISSOLUTION METHOD TEST RESULTS

| Formulation | Observed Mass Loss (%) | Theoretical Mass Loss (%) |
|---|---|---|
| 8 | 58 | 60 |
| 10 | 55 | 60 |
| 11 | 78 | 80 |
| 12 | 52 | 60 |
| 13 | 48 | 60 |
| 14 | 50 | 60 |
| 15 | 50 | 60 |
| 16 | 47 | 60 |

DSC/TGA Characterization

A differential scanning calorimetry (DSC) and thermal gravimetric analysis (TGA) study was performed on WSP 1 and Formulations 1-16. WSP 1 and all Formulations were heated from room temperature to 350° C. at a ramp rate of 10° C./min in air. Table 6 shows the results of this characterization, specifically key DSC glass transition temperatures (Tg), melting temperatures (Tm), and decomposition temperatures.

TABLE 6

DSC/TGA ON WSP 1 AND FORMULATIONS 1-16

| Formulation | Glass Transition Temperature (° C.) | Melting Temperature(s) (° C.) | Decomposition Temperature (° C.) |
|---|---|---|---|
| WSP 1 | 84 | 181 | 275 |
| 1 | 86 | 181, 218 | 255 |
| 2 | 83 | 182, 220 | 260 |
| 3 | 90 | 182, 220 | 275 |
| 4 | 88 | 182, 220 | 280 |
| 5 | 90 | 182, 257 | 275 |
| 6 | 86 | 182, 260 | 290 |
| 7 | 86 | 180 | 295 |
| 8 | 85 | 181 | 300 |
| 9 | 85 | 182, 237 | 270 |
| 10 | 88 | 180, 232 | 265 |
| 11 | NA | 210 | 276 |
| 12 | NA | 210 | 272 |
| 13 | 80 | 168 | 303 |
| 14 | 87 | 167 | 301 |
| 15 | 65 | 153, 180 | 300 |
| 16 | 65 | 152, 179 | 300 |

Capillary Rheology Characterization

Capillary rheology was performed on Formulations WSP 1 and 1-16 using a capillary rheometer (Commercially available from Dynisco, Franklin, Massachusetts). All Formulations were first analyzed at 220° C. For Formulations that did not melt/process at 220° C., the temperature was increased to 240° C. For Formulations that had too low of a viscosity at 220° C., the temperature was lowered to 190° C. Formulations that did not process at 220° C., 240° C., or 190° C. were not tested. Formulations were analyzed between shear rates of 100 and 30,0000 $s^{-1}$. Table 7 shows the results of this characterization, specifically apparent viscosity at the temperatures tested.

TABLE 7

CAPILLARY RHEOLOGY ON WSP 1 AND FORMULATIONS 1-16

| Formulation | Apparent Viscosity @190° C. Shear Rate of 100/s (Pa-s) | Apparent Viscosity @ 220° C. Shear Rate of 100/s (Pa-s) | Apparent Viscosity @ 240° C. Shear Rate of 100/s (Pa-s) | Comments |
|---|---|---|---|---|
| WSP 1 | 5000 | 1500 | 1100 | |
| 1 | N/A | 1500 | N/A | |
| 2 | N/A | 1600 | N/A | |
| 3 | N/A | 1500 | N/A | |
| 4 | N/A | 1500 | N/A | |
| 5 | N/A | 4500 | 2500 | |
| 6 | N/A | N/A | N/A | No Melt at 190° C., 220° C., or 240° C. |
| 7 | N/A | 600 | N/A | |
| 8 | N/A | 700 | N/A | |
| 9 | N/A | 2400 | N/A | |
| 10 | N/A | N/A | 700 | |
| 11 | 50 | N/A | N/A | |
| 12 | 150 | N/A | N/A | |
| 13 | N/A | 800 | 600 | |
| 14 | N/A | 700 | N/A | |
| 15 | N/A | 50 | N/A | |
| 16 | N/A | 150 | N/A | |

Having thus described particular embodiments, those of skill in the art will readily appreciate that the teachings found herein may be applied to yet other embodiments within the scope of the claims hereto attached.

What is claimed is:

1. A water soluble polymer blend composition comprising:

at least one water soluble polymer; and at least one immiscible polymer;

wherein the at least one water soluble polymer and the at least one immiscible polymer are processed above the respective melt processing temperatures of the at least one water soluble polymer and the at least one immiscible polymer and quenched to form the water soluble polymer blend composition;

wherein the water soluble polymer blend composition has a nonequilibrium morphology; and wherein the non-equilibrium morphology of the water soluble polymer blend composition is a microfiber morphology.

2. The water soluble polymer blend composition of claim 1, wherein the water soluble polymer blend composition is substantially stable at a build chamber temperature of at least about 160° C.

3. The water soluble polymer blend composition of claim 1, wherein the at least one immiscible polymer comprises a high density polyethylene, low density polyethylene, linear low density polyethylene, crosslinked polyethylene, vulcanized rubber, functional polyolefin copolymer, polypropylene, polyolefin copolymer, polyacrylate, polymethacrylate, polyester, polyvinylchloride, fluoropolymer, polyamide, polyether imide, polyphenylene sulfide, polysulfone, polyacetal, polycarbonate, polyphenylene oxide, polyurethane, thermoplastic elastomer, epoxy, alkyd, melamine, phenolic, urea, vinyl ester, cyanate ester, silicone, or a combination thereof.

4. The water soluble polymer blend composition of claim 1, wherein the at least one immiscible polymer comprises Nylon 6, Nylon 6.6, Nylon 11, Nylon 12, a liquid crystalline polymer, or a combination thereof.

5. The water soluble polymer blend composition of claim 1, further comprising at least one sugar.

6. The water soluble polymer blend composition of claim 1, wherein the water soluble polymer blend composition forms a feedstock.

7. The water soluble polymer blend composition of claim 1, wherein the at least one water soluble polymer comprises a copolymer of a polyvinyl alcohol.

8. The water soluble polymer blend composition of claim 7, wherein the copolymer is polyvinyl alcohol-co-vinylpyrrolidinone.

9. The water soluble polymer blend composition of claim 1, further comprising at least one additive.

10. The water soluble polymer blend composition of claim 9, wherein the at least one additive is a compatibilizer.

11. The water soluble polymer blend composition of claim 10, wherein the nonequilibrium morphology is thermally stable after annealing.

12. The water soluble polymer blend composition of claim 1, wherein at least a portion of the at least one water soluble polymer in the water soluble polymer blend composition is removed by dissolution in water to provide the microfiber morphology comprising one or more immiscible polymer microfibers or the co-continuous morphology comprising a co-continuous porous morphology.

13. The water soluble polymer blend composition of claim 12, wherein the one or more immiscible polymer microfibers have an average length to diameter ratio of at least 3:1.

14. The water soluble polymer blend composition of claim 12, wherein the co-continuous porous morphology has co-continuous channels having an average diameter of at least 0.1 micron and up to 50 microns.

15. An article comprising the water soluble polymer blend composition of claim 6.

* * * * *